(12) United States Patent
Mandell et al.

(10) Patent No.: US 11,060,426 B2
(45) Date of Patent: Jul. 13, 2021

(54) FINGER FOLLOWER FOR LOBE SWITCHING AND SINGLE SOURCE LOST MOTION

(71) Applicant: Jacobs Vehicle Systems, Inc., Bloomfield, CT (US)

(72) Inventors: John Mandell, Vernon, CT (US); Justin D. Baltrucki, Canton, CT (US); David M. Ferreira, Glastonbury, CT (US)

(73) Assignee: JACOBS VEHICLE SYSTEMS, INC., Bloomfield, CT (US)

( * ) Notice: Subject to any disclaimer, the term of this patent is extended or adjusted under 35 U.S.C. 154(b) by 0 days.

(21) Appl. No.: 16/706,226

(22) Filed: Dec. 6, 2019

(65) Prior Publication Data

US 2020/0182107 A1   Jun. 11, 2020

Related U.S. Application Data

(60) Provisional application No. 62/776,450, filed on Dec. 6, 2018, provisional application No. 62/776,453, filed on Dec. 6, 2018.

(51) Int. Cl.
*F01L 1/18*   (2006.01)
*F01L 13/00*   (2006.01)
(Continued)

(52) U.S. Cl.
CPC .......... *F01L 13/0005* (2013.01); *F01L 1/185* (2013.01); *F02D 13/0211* (2013.01);
(Continued)

(58) Field of Classification Search
CPC ... F01L 1/185; F01L 2001/186; F01L 1/2405; F01L 13/0005; F01L 2305/00
(Continued)

(56) References Cited

U.S. PATENT DOCUMENTS 5,577,469 A * 11/1996 Muller .................... F01L 1/181
                                                        123/90.16
7,546,822 B2   6/2009 Murphy et al.
(Continued)

FOREIGN PATENT DOCUMENTS

DE   102017114933 B3   8/2018
JP   2014532840 A   12/2014
(Continued)

OTHER PUBLICATIONS

International Search Report for International Application No. PCT/US2019/065007 dated Mar. 31, 2020, 3 pages.
(Continued)

*Primary Examiner* — Jorge L Leon, Jr.
(74) *Attorney, Agent, or Firm* — Moreno IP Law LLC

(57) ABSTRACT

A switching finger follower for an engine valve train utilizes an adjustable support assembly that eliminates potential for partial engagement during operation. A lever engagement member or latch is disposed for movement on the follower body and interacts with a lever to provide a constant contact geometry. The finger follower may be configured as a lost motion device and may include a biasing assembly and a travel limiter. The latch may support the lever in at least one precise position and may support the lever in a second position for partial lost motion, or permit the lever to pivot free of the latch for complete lost motion, as in cylinder deactivation applications.

25 Claims, 13 Drawing Sheets

(51) Int. Cl.
*F02D 13/02* (2006.01)
*F01L 1/24* (2006.01)

(52) U.S. Cl.
CPC ....... *F01L 1/2405* (2013.01); *F01L 2013/001* (2013.01); *F01L 2305/00* (2020.05)

(58) Field of Classification Search
USPC .......... 123/90.16, 90.41, 90.43, 90.44, 90.46
See application file for complete search history.

(56) References Cited

U.S. PATENT DOCUMENTS

| | | | |
|---|---|---|---|
| 9,347,383 B2 | 5/2016 | Janak et al. | |
| 2003/0159669 A1* | 8/2003 | Duesmann | F01L 13/0005 123/90.16 |
| 2007/0039573 A1 | 2/2007 | Deierlein | |
| 2010/0307434 A1* | 12/2010 | Odell | F01L 1/267 123/90.15 |
| 2011/0226209 A1* | 9/2011 | Zurface | F01L 1/185 123/90.44 |
| 2013/0104821 A1* | 5/2013 | Villemure | F01L 1/18 123/90.16 |
| 2014/0290608 A1* | 10/2014 | Radulescu | F01L 1/18 123/90.39 |
| 2015/0275712 A1* | 10/2015 | Manther | F01L 1/185 123/90.16 |
| 2015/0285110 A1* | 10/2015 | Sugiura | F01L 13/0036 123/90.16 |
| 2016/0003111 A1* | 1/2016 | Evans | F01L 1/205 123/90.45 |
| 2016/0084119 A1 | 3/2016 | Sugiura et al. | |
| 2018/0045081 A1* | 2/2018 | Rehm | F01L 13/0005 |
| 2018/0094551 A1* | 4/2018 | Mohan Das | F01L 1/24 |
| 2019/0316494 A1 | 10/2019 | Mariuz et al. | |
| 2019/0368386 A1* | 12/2019 | Foster | F01L 13/0005 |
| 2019/0368392 A1* | 12/2019 | Ahmed | F01L 13/0015 |
| 2019/0376420 A1 | 12/2019 | Elendt et al. | |

FOREIGN PATENT DOCUMENTS

| | | |
|---|---|---|
| JP | 201844534 A | 3/2018 |
| WO | 2019060131 A1 | 3/2019 |

OTHER PUBLICATIONS

Written Opinion of the ISA for International Application No. PCT/US2019/065007 dated Mar. 31, 2020, 6 pages.

\* cited by examiner

FINGER FOLLOWER FOR LOBE SWITCHING AND SINGLE SOURCE LOST MOTION

RELATED APPLICATIONS AND PRIORITY CLAIM

The instant application claims priority to U.S. provisional patent application Ser. No. 62/776,450, filed on Dec. 6, 2018 and titled SWITCHING FINGER FOLLOWER. The instant application further claims priority to U.S. provisional application Ser. No. 62/776,453, filed on Dec. 6, 2018 and titled SWITCHING FINGER FOLLOWER FOR SINGLE-SOURCE LOST MOTION. The subject matter of both of these provisional applications is incorporated by reference herein in its entirety.

FIELD

The instant disclosure relates generally to systems and methods for actuating one or more engine valves in an internal combustion engine. More particularly, the instant disclosure relates to systems and methods for varying the operational relationship between a motion source, such as a cam, and one or more engine valves. Such systems and methods may include a rocker arm in the form of a finger follower, which provides for selectively switching between lobes on a cam and/or for operating as lost motion devices in an engine valve train.

BACKGROUND

Internal combustion engines are utilized ubiquitously in many applications and industries, including transportation and trucking. Valve actuation systems for use in internal combustion engines are well known in the art. Such systems typically include one or more intervening components that convey valve actuation motions from a valve actuation motion source (e.g., a cam) to one or more engine valves, the intervening components constituting a valve train. These valve actuation systems may primarily facilitate a positive power mode of operation in which the engine cylinders generate power from combustion processes. The intake and exhaust valve actuation motions associated with the standard combustion cycle are typically referred to as "main event" motions. Known engine valve actuation systems may provide for modified main event valve motion, such as early or late intake valve closing. In addition to main event motions, known engine valve actuation systems may facilitate auxiliary valve actuation motions or events that allow an internal combustion engine to operate in other modes, or in variations of positive power generation mode (e.g., exhaust gas recirculation (EGR), early exhaust valve opening (EEVO), etc.) or engine braking in which the internal combustion engine is operated in an unfueled state, essentially as an air compressor, to develop retarding power to assist in slowing down the vehicle.

In many engine systems, the valve train may comprise a finger follower, which is essentially a lever pivoting at one end with the other end of the lever contacting the load, i.e., the engine valves. The finger follower typically comprises a motion receiving component, disposed between the ends of the lever, to receive the valve actuation motions from a motion source (such as a cam), which motions are then conveyed to the engine valves via the load end of the lever.

Known variations of the finger follower components described above include so-called "switching" finger followers, an example of which is described in U.S. Pat. No. 7,546,822, the subject matter of which is incorporated herein by reference. As shown in FIG. 1, the finger follower comprises a body 11 pivoting about, in this example, a hydraulic lash adjuster (HLA) 2. The body 11 also supports, in this example, lateral followers 30 that may rotate about a shaft 17 and that may engage a locking mechanism 40. As best illustrated in FIGS. 2 and 3, the body 11 further supports a central roller follower 20 positioned between the lateral followers 30. As further shown in FIGS. 2 and 3, the locking mechanism 40 may be controlled such that a locking bar 48 is either maintained in an extended position and thereby in contact with tabs 38 of the lateral followers 30 (FIG. 2), or maintained in a retracted position and thereby avoiding contact with the tabs 38 (FIG. 3). When the locking bar 48 contacts the tabs 38 (i.e., in a locked or on condition), the lateral followers 30 are prevented from rotating about the shaft 17 and are therefore maintained in a rigid relationship with the body 11. Thus, motions applied to the lateral followers 30 by lateral cam lobes 9 are conveyed to body and ultimately to the engine valve 3. In this case, valve actuation motions provided by central cam lobe 8 are not conveyed to the central roller follower 20 with which it is aligned. On the other hand, when the locking bar 48 is retracted (i.e., in an unlocked or off condition), the lateral followers 30 are free to rotate about the shaft 17 such that any motions applied by the lateral cam lobes 9 are absorbed by the lateral followers 30 and not conveyed to the engine valve 3 by the body 11. In this case, valve actuation motions provided by the central cam lobe 8 are conveyed to the central roller follower 20 and, thereby, on to the engine valve 3.

Switching finger followers are most often found in light duty automotive applications. However, they have not been applied in heavy and medium duty diesel or natural gas engines partially because of the highly loaded events and failures due to partially engaged switching mechanisms. Failures are known to occur even in light duty applications due to the same partial engagement problem at much lower loads. With reference to the example in FIGS. 2 and 3, such a partial engagement occurs when the locking bar 48 only partially overlaps with the tab 38, i.e., at a location between the engagements illustrated in FIGS. 2 and 3. When such partial engagements occur, contract stresses between the moving parts of the locking mechanism can increase significantly, leading to damage and/or failure of the locking mechanism.

Another disadvantage of prior art switching finger followers is that their use typically necessitates controls for precise timing in order to prevent partial engagement of their actuating or locking components. This may necessitate added cost and complexity, especially in multiple cylinder engine environments. For example, in such environments, it may be necessary to provide designated control solenoids for each switching finger follower in order to eliminate the potential for control circuit transients (i.e., lag in a hydraulic circuit) and to ensure precise timing of actuating components relative to the finger follower motion.

Switching finger followers may have application to lost motion valve actuation systems. In such systems, the switching finger follower may switch between a first position, in which the full valve motion from a motion source, such as a cam, is conveyed to the engine valves, and a second position, in which only part of the full valve motion is conveyed to the engine valves. An example of a single-source, lost motion lift profile as described herein may be found in FIG. 5, curve 502 of U.S. Pat. No. 9,347,383, the teachings of which are incorporated herein by this reference. Owing to the aforementioned disadvantages, however, prior art switching finger followers may have only limited applicability to lost motion valve actuation systems.

It would therefore be advantageous to provide systems and methods that address the aforementioned shortcoming and others in the prior art.

SUMMARY

Responsive to the foregoing challenges in the prior art, the instant disclosure provides various embodiments of a switching finger follower system with improved operating characteristics and improved performance and durability.

The above-mentioned difficulties with prior switching finger followers may be overcome based on various embodiments disclosed herein. The advances in the art described herein are particularly advantageous in that they eliminate the potential for partial engagement of finger follower switching mechanism actuating components. A related advantage is the elimination of variations in the locked or supported positions of the motion receiving component on the switching finger follower. The switching finger follower configurations have consistent contact geometries between cooperating parts and positively defined switching mechanism positions and thus positively defined positions of the finger follower lever and thus the motion receiving component relative to the body. This leads to more accurate and dependable operation and control of valve motion.

Additionally, because the switching finger follower configurations disclosed herein are not sensitive to partial engagement, activation of the switching mechanism, they may be utilized at lower cost and complexity in multiple cylinder engine environments. The improved switching mechanism and actuator therefore eliminate the need for precise timing by control components. For example, in the case of hydraulically actuated switching mechanisms under the control of solenoids, the disclosed embodiments may eliminate the need for a designated, controlled solenoid for each switching mechanism. Rather, the disclosed advances make it feasible for a single solenoid to activate switching mechanisms for multiple cylinders, thereby simplifying the overall system and reducing costs.

Further still, the embodiments described herein are applicable to and may be used to improve single-source lost motion systems where a single valve actuation motion source (such as a cam) provides one or more lower lift events where some (or all) lift is lost, and one or more higher lift events where more (or all) lift from the cam lobe is conveyed to the engine valves. Further still, the embodiments described herein are applicable to and may be used to improve lost-motion valve actuation systems in which valve motion is entirely lost, as may be required in systems that utilize cylinder deactivation.

The embodiments described herein may be particularly advantageous in achieving alternative valve motions, such as braking late intake valve closing (LIVC), early exhaust valve opening (EEVO), internal exhaust gas recirculation (IEGR) etc.

According to an aspect of the disclosure, there is provided a finger follower system for use in an internal combustion engine valvetrain comprising: a follower body having a pivot end and a motion transmitting end; a lever adapted to pivot relative to the follower body; a motion receiving component having a motion receiving surface disposed between the follower body pivot end and the follower body motion transmitting end; and an adjustable support assembly including a movable latch for providing selective support to the lever, the adjustable support assembly adapted to maintain the latch in a first latch position and a second latch position relative to the follower body. According to a further aspect, the adjustable support assembly is further adapted to allow the latch to move to the first position when the latch is not in the second position. In some applications, the adjustable support assembly may be further adapted to support the lever in two defined positions, providing engagement between the lever and the latch when the latch is in the first latch position and when the latch is in the second latch position. In other applications where the finger follower may facilitate complete loss of motion source motion, such as in cylinder deactivation applications, the adjustable support assembly may be adapted to provide for engagement between the latch and lever when the latch is in a first latch position, and to permit the lever to pivot free of the latch (i.e., no engagement between the latch and lever) when the latch is in a second latch position.

In one implementation, a finger follower with an adjustable support assembly may include an adjustable latch or lever engaging member adapted to move within the follower body to support the finger follower lever in at least one position. The lever engaging member or latch may cooperate with an actuating piston, which may extend through a transverse bore in the lever engaging member. The piston may have first and second support surfaces which may provide for two respective positively defined positions for the lever engaging member. In some applications, these two positions may correspond to positively defined support positions for the finger follower lever. In other applications, only one of the latch positions may support the lever, and the other position of the latch may correspond to the lever being free to pivot to a (lower) position in which it is not engaged with the latch. The adjustable support assembly structure is adapted to avoid application of load forces to the actuating components when the lever engages the latch in a position other than the precisely defined positions defined by the adjustable support assembly, thus avoiding damage to the actuating components and/or lever due to partial engagement.

In one implementation, the finger follower may include a lever engaging member or latch supported for movement relative to the finger follower body and having a substantially planar lever engaging member surface or latch surface extending at an angle to a latch movement direction for engaging an arcuate surface on the lever. The finger follower lever may be provided with an arcuate surface adapted to be engaged by the planar lever engaging surface on the lever engaging member. The lever engaging member surface and lever surface are thus adapted to maintain a substantially similar contact geometry when the lever and lever engaging member surface are engaged. In addition to eliminating potential for partial engagement, these aspects provide for improved durability and operation.

According to another implementation, the finger follower assembly may be applied in single motion source lost motion engine valvetrain environments. In some applications, the adjustable support assembly may support the finger follower lever in at least two positions, at least one of which may be a lost motion position. In other applications, the adjustable support assembly may support the finger follower lever in at least one position, and in another position, permit the finger follower lever to pivot freely such that no motion source motion is conveyed to the engine valves (as maybe the case in cylinder deactivation applications). A biasing assembly may comprise at least one resilient element disposed between at least one spring support on the follower body and at least one spring support on the lever. A travel limiter on the body may limit upward movement of the lever. One or more precisely defined lever support positions may be implemented by the interaction of the lever engaging member and actuating piston to provide for full or partial conveyance (or full or partial loss) of valve motion through the lost motion finger follower.

According to another implementation, a finger follower may be provided with an eccentric pivot mount that may provide for adjustment of the position of the finger follower lever relative to the follower body.

Other aspects and advantages of the disclosure will be apparent to those of ordinary skill from the detailed description that follows and the above aspects should not be viewed as exhaustive or limiting. The foregoing general description and the following detailed description are intended to provide examples of the inventive aspects of this disclosure and should in no way be construed as limiting or restrictive of the scope defined in the appended claims

DESCRIPTION OF THE DRAWINGS

The above and other attendant advantages and features of the invention will be apparent from the following detailed description together with the accompanying drawings, in which like reference numerals represent like elements throughout. It will be understood that the description and embodiments are intended as illustrative examples according to aspects of the disclosure and are not intended to be limiting to the scope of invention, which is set forth in the claims appended hereto. In the following descriptions of the figures, all illustrations pertain to features that are examples according to aspects of the instant disclosure, unless otherwise noted.

DETAILED DESCRIPTION

Figure 1:
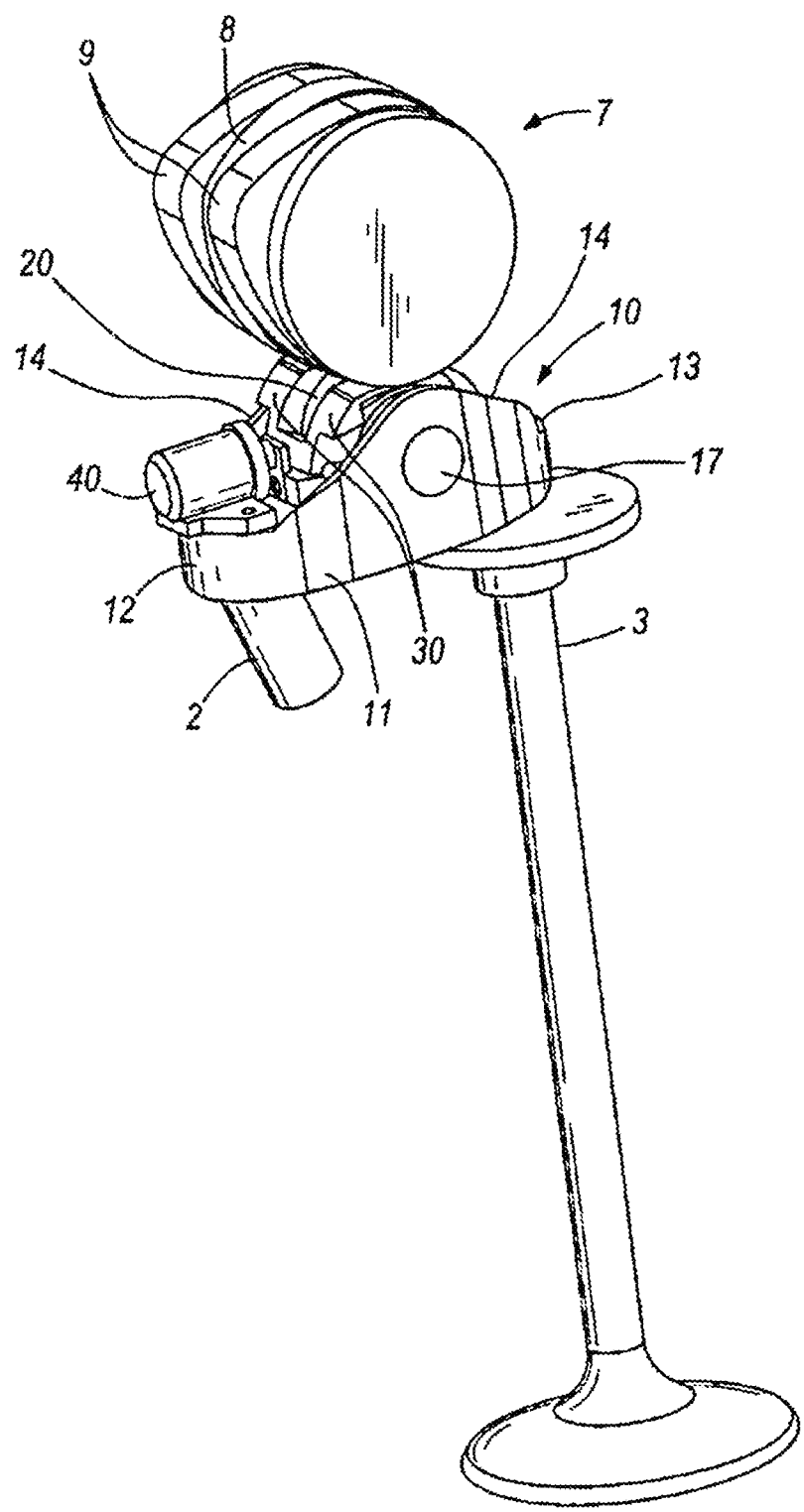
FIG. 1 is a perspective of an example prior art switching finger follower and an engine valve train environment, which environment may be suitable for implementing aspects of the instant disclosure.
Figure 4:
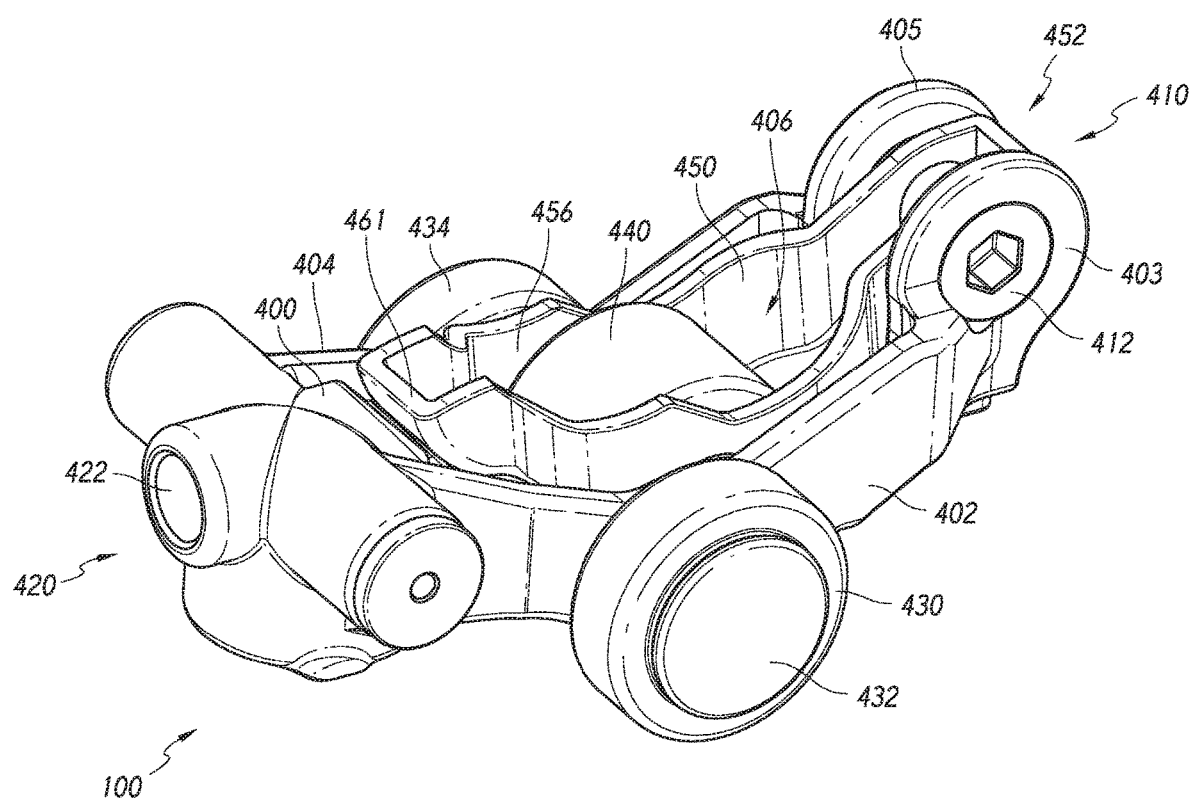
FIG. 4 is a perspective, assembled view of an example finger follower assembly.
Figure 5:
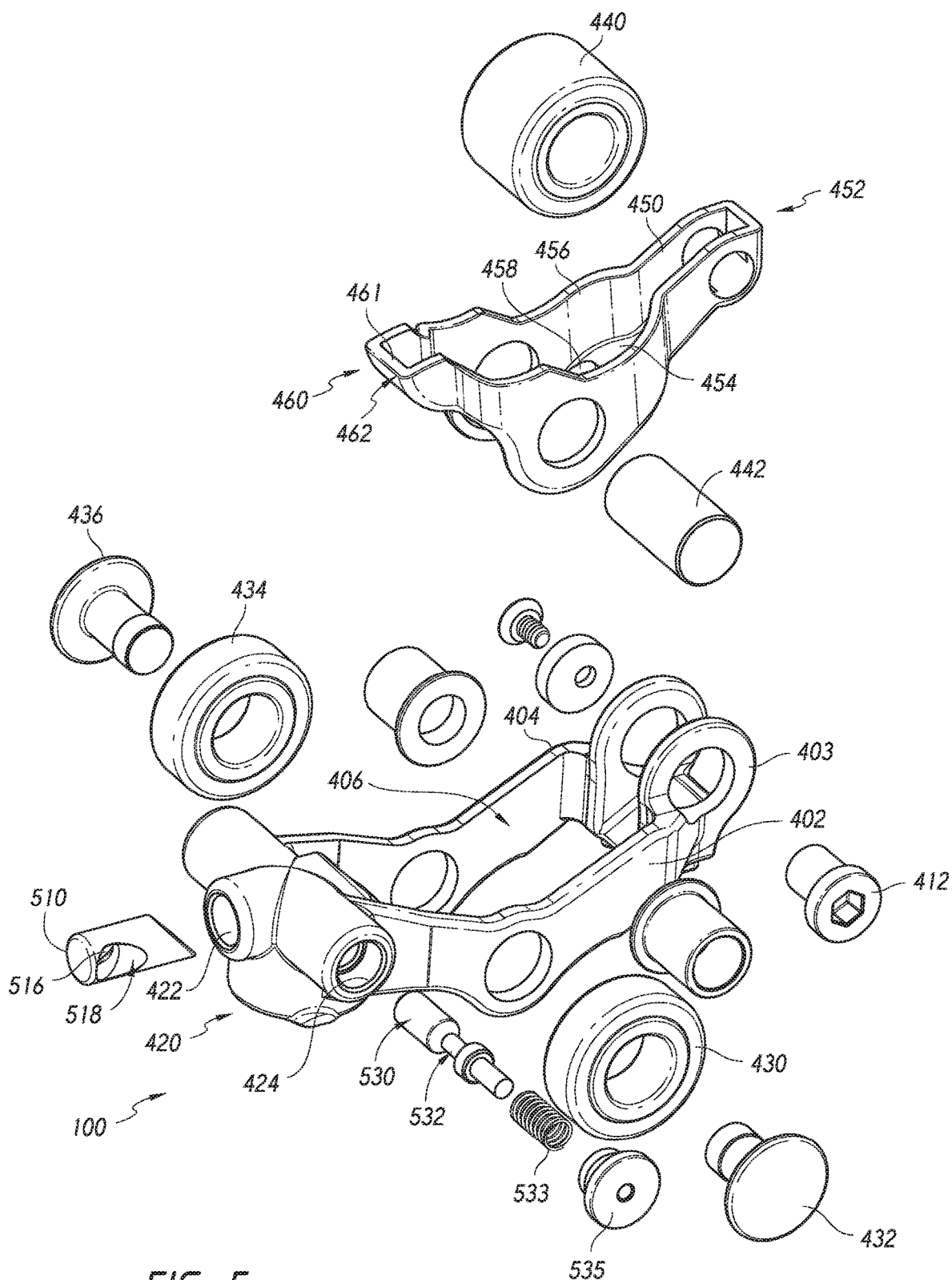
FIG. 5 is a perspective, exploded view of the example finger follower assembly of FIG. 4.
Figure 6:
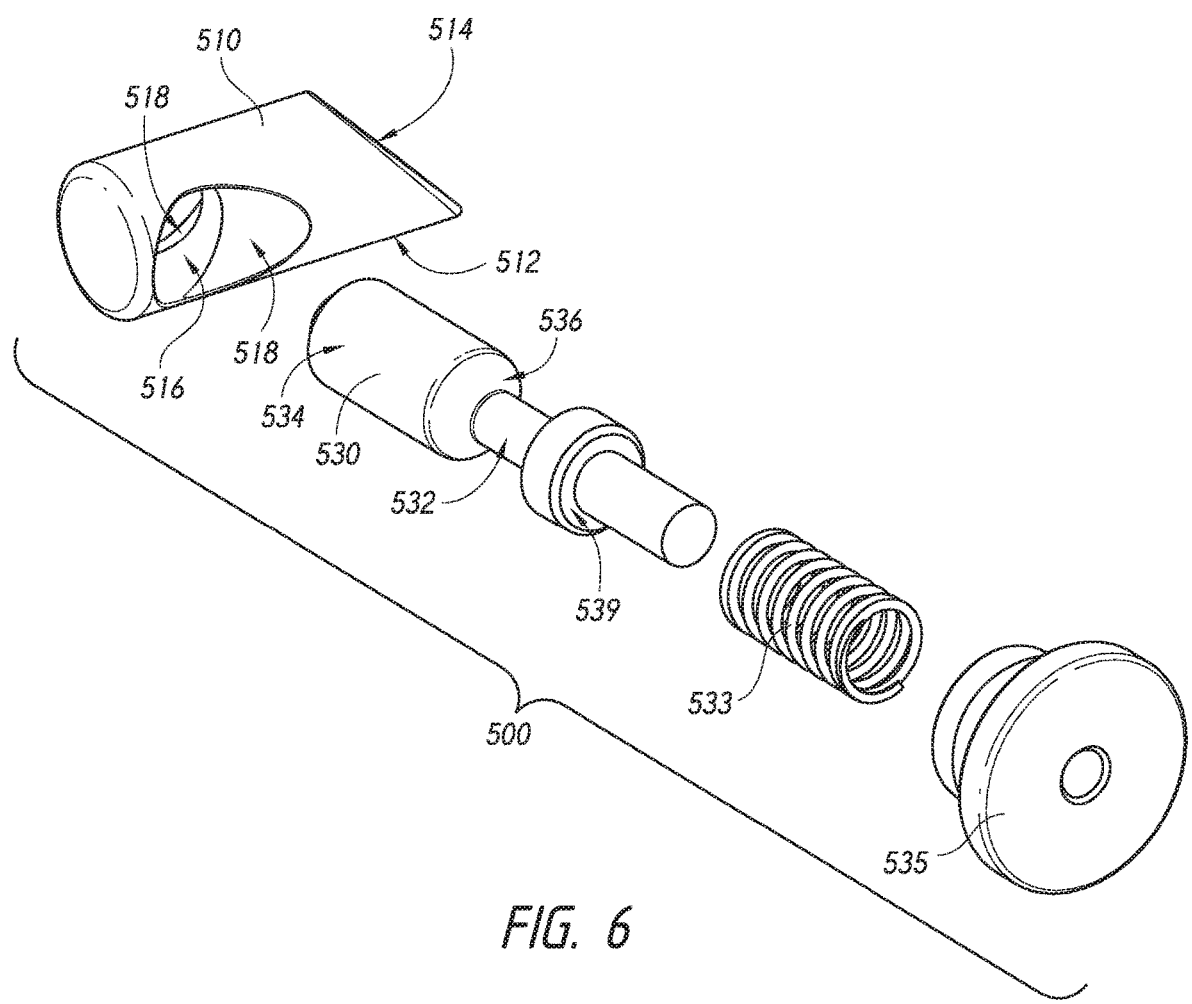
FIG. 6 is a detailed perspective exploded view of a finger follower adjustable support assembly.

FIG. 4 is a perspective view of an example assembled switching finger follower system 100 in accordance with the instant disclosure. FIG. 5 is an exploded perspective view of the same system. In particular, the switching finger follower may comprise a body or housing 400, arranged to support or house various other system components. Body 400 may extend in a longitudinal direction from a motion transmitting end or valve engaging end 410, adapted to interface with or engage one or more engine valves, to a pivot end 420, adapted to interface with or engage a pivot, which may include an HLA. Body 400 may further comprise a pair of lateral, longitudinally extending arms 402 and 404, defining a lever recess or pocket 406 therebetween. Arms 402 and 404 may include respective pivot pin receiving bores 403 and 405 at the valve engaging end 410 for securing a lever pivot pin 412 therein. A pair of lateral roller followers 430 and 434 may be secured to arms 402 and 404 via shafts 432 and 436, respectively. The lateral roller followers 430, 434 are configured to receive valve actuation motions from complementarily configured valve actuation motion sources, for example, motion sources similar to the lateral cam lobes 9 illustrated in FIG. 1. Although the lateral followers are illustrated in roller form, it is appreciated that the instant disclosure need not be limited in this regard as the lateral followers could be implemented, for example, as flat follower contact areas extending from the body 400.

Body 400 may further support a lever 450 having a fastened end 452, that may be mounted to pivotably cooperate with the follower body 400, and extending in the longitudinal direction to a free end 460. The fastened end of lever 450 may be fastened to the lever pivot pin 412 secured to arms 402, 404 of the body 400.

Lever 450 may have a shape that is complementary to the recess or pocket 406 in the body 400, thereby providing for a nested positioning within the body 400 and an overall compact finger follower configuration. Lever 450 may be formed as a precision, unitary stamped metal (i.e., steel) component having a generally concave shape with a bottom wall 454 and an integral outer wall 456 extending from the bottom wall 454. A central portion of lever 450 may support and house a motion receiving component, cooperatively associated with the lever. The motion receiving component may be a central roller follower 440 supported on a shaft 442 affixed to the lever 450. Alternatively, the motion receiving component cooperatively associated with the lever may be a contact surface directly on or attached to the lever and adapted to directly engage the motion source or a valve train component cooperating with the motion source. A recess or cutout 458 may be formed in bottom wall 454 to accommodate the central roller follower 440. Free end 460 of the lever may have an arcuate or otherwise curved lever end wall 461 having an arcuate or otherwise curved end surface 462, for selectively engaging an adjustable support assembly 500 integrated into the body 400, as will be described. End wall 461 may extend to and be contoured to have a smooth transition with the bottom wall 454. Lever end wall 461 may extend between a reduced lateral dimension between the opposing portions of outer wall 456, which may provide added stability and strength as well as reduce the potential for deformation of the end wall 461 during operation.

Figure 2:
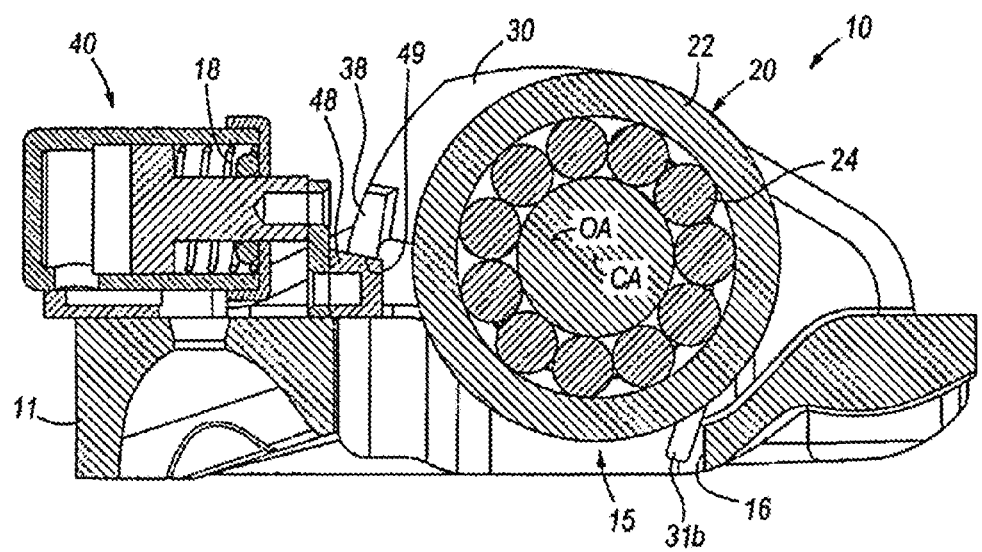
FIG. 2 is a cross-section of the finger follower system of FIG. 1 in an "on" state.
Figure 3:
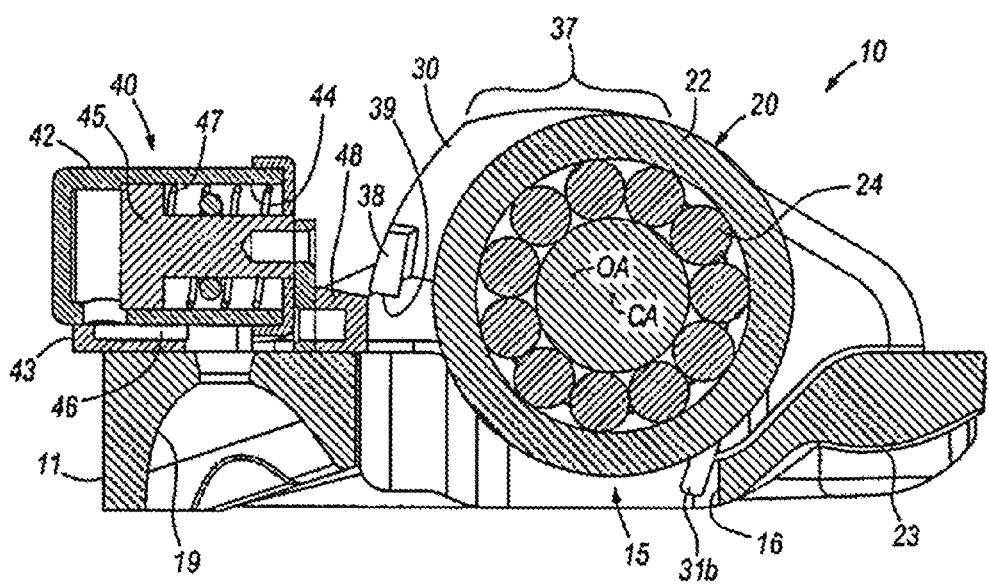
FIG. 3 is a cross-section of the finger follower system of FIG. 1 in an "off" state.

As will be recognized, central roller follower 440 may be configured to selectively receive valve actuation motions from a complementarily configured valve actuation motion source. Referring, for example, to the engine environment described above with respect to FIG. 1, the central roller follower 440 may receive valve actuation motions from a central cam lobe, similar to cam lobe 8 in FIG. 1. As will be recognized, according to aspects of the disclosure, the finger follower configurations described herein have the advantage of permitting wider lateral and central follower dimensions compared to prior art systems such as the system described above with respect to FIGS. 1-3. This, in turn, permits wider cam surfaces and may thus provide reduced contact stresses and wear between cams and followers, for example.

Referring additionally to FIGS. 6-10, the pivot end 420 of the finger follower body 400 may include a longitudinal bore 422 and a transverse bore 424 formed therein for housing components of an adjustable support assembly 500. Pivot end 420 may also include a concave recess or pocket 426 for interfacing with a suitable pivot assembly, such as a hydraulic lash adjuster having a post adapted to fit within the recess or pocket 426, and including a hydraulic passage 428 (FIG. 8) for delivering a pressurized hydraulic working fluid (oil) to the finger follower, as will be further described.

Adjustable support assembly 500 may include lever engaging member or latch 510 and an actuating piston 530 cooperatively associated therewith. Lever engaging member or latch 510 may be disposed in longitudinal bore 422, which includes a cylindrical guiding surface 423 for supporting and facilitating sliding movement of the lever engaging member or latch 510. Lever engaging member or latch 510 may have a generally cylindrical shape including an outer cylindrical surface 512 and a substantially planar lever engaging surface 514, which may extend at an angle to the axis of lever engaging member or latch 510. A transverse actuating piston receiving bore 516 may extend through the lever engaging member or latch 510 for receiving and cooperating with the actuating piston 530. Moreover, lever engaging member or latch 510 may be provided with chamfered surfaces 518 (FIG. 5) on each side, which transition from the outer surface of lever engaging member or latch 510 to the piston receiving bore 516 to provide for smooth interaction with the surfaces of piston 530. It will also be recognized that chamfered surfaces 518 provide for a reduction in the width of transverse piston receiving bore 516 and thereby eliminate the need for precise alignment of the transverse bore 516 with the piston 530 in order for the transverse bore 516 to engage the reduced diameter piston surface 532.

Actuating piston 530 may include a first support surface 532 adapted to engage and support the lever engaging member or latch 510 in a first position within longitudinal bore 422, which first position may correspond to an unlocked, or lower or retracted position of the lever 450 and central follower 440 relative to body 400. First support surface 532 may be a cylindrical surface having a first diameter. Actuating piston 530 may also include a second support surface 534 adapted to engage and support the lever engaging member or latch 510 in a second position within longitudinal bore 422, which second position may correspond to a locked, or raised, or deployed position of the lever 450 and central follower 440 relative to body 400. Second support surface may be a cylindrical surface having a second diameter, greater than the first diameter of first support surface and substantially corresponding to the diameter of the transverse bore 424 of body 400 and substantially corresponding to the diameter of transverse actuating piston receiving bore 516. Disposed between the first support surface 532 and second support surface 534 may be a transition surface 536 on the actuating piston 530, which transition surface 536 may have a generally tapered or conical shape adapted to provide for smooth transition of the lever engaging member from the first support position to the second position during a locking movement of the actuating piston. Transition surface 536 may also facilitate the reversion of the actuating piston to an unlocked position if actuating piston may be in an intermediate position between a fully retracted or fully deployed position within transverse bore 424, as will be explained in more detail below.

Figure 7:
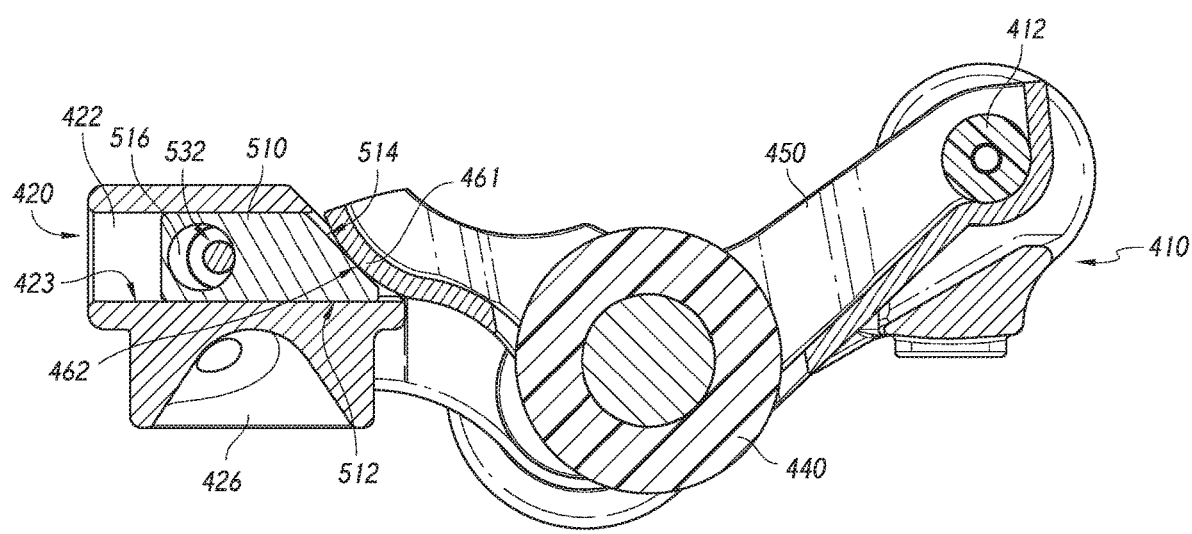
FIG. 7 is cross-section in a lateral plane of the finger follower assembly of FIG. 4 in a first state, which may be an "off" or "unlocked" state.
Figure 8:
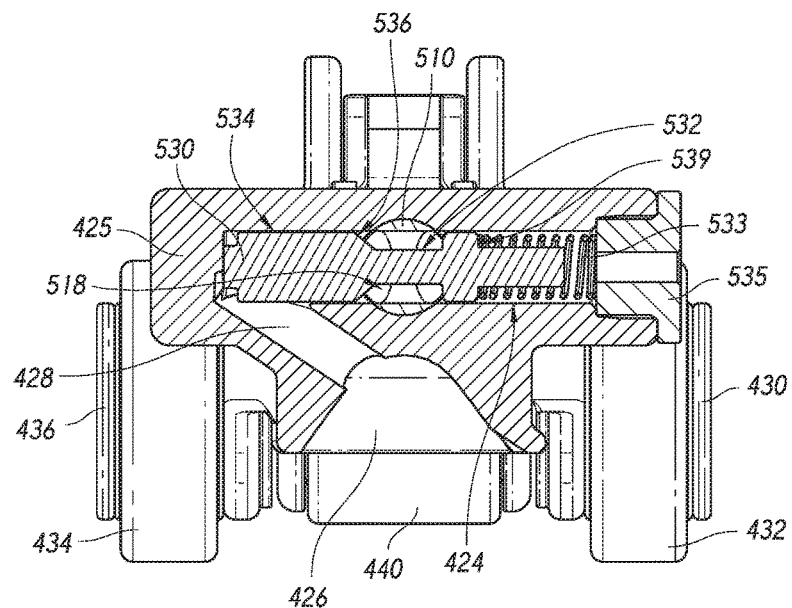
FIG. 8 is a cross section in a transverse plane of the finger follower assembly of FIG. 4, in a first state.

Operation of the adjustable support assembly 500 will now be described. FIGS. 7 and 8 illustrate the example switching finger follower in an "unlocked" or off state, in which the lever 450 is in a lower position relative to the body 400. Piston 530 is retracted fully within transverse bore 424, bottoming against an end wall 425 of transverse bore 424. A biasing device, such as a coil spring 533, may be disposed in the transverse bore 424 to engage a spring seat 539 and bias the piston towards the retracted position. This position aligns the first support surface 532 of the actuating piston 530 with the transverse piston receiving bore 516 of lever engaging member or latch 510. Lever engaging member or latch 510 is retracted within the longitudinal bore such that contact surface 514 is positioned to contact the lever end surface 462 along a first line of contact, which may be at a lower position on the surface 514 of (i.e., below the axis of) lever engaging member or latch 510. A spring retaining cap 535 may be affixed to body 400 (i.e., by press fit or threads) to retain the spring 533 and piston 530 within the transverse bore 424.

As shown in FIG. 8, the pivot receiving pocket 426 of body 400 may be hydraulically connected, via a hydraulic passage 428, to the transverse bore 424. When pressurized hydraulic fluid is not supplied to the first transverse bore via the hydraulic passage 428, the biasing device 533 may bias the piston 530 leftward as illustrated in FIG. 8. In this state, the reduced diameter piston surface 532 of the piston 530 is aligned with the lever engaging member or latch 510. Because the lever 450 is thus maintained in a lower position relatively to the body 400, the central roller follower 440 is likewise maintained in a lower position, thereby establishing lash between the central roller follower 440 and its corresponding valve actuation motion source. This lash space causes any valve actuation motions that would otherwise be applied to the central roller follower 440 to be lost.

Figure 9:
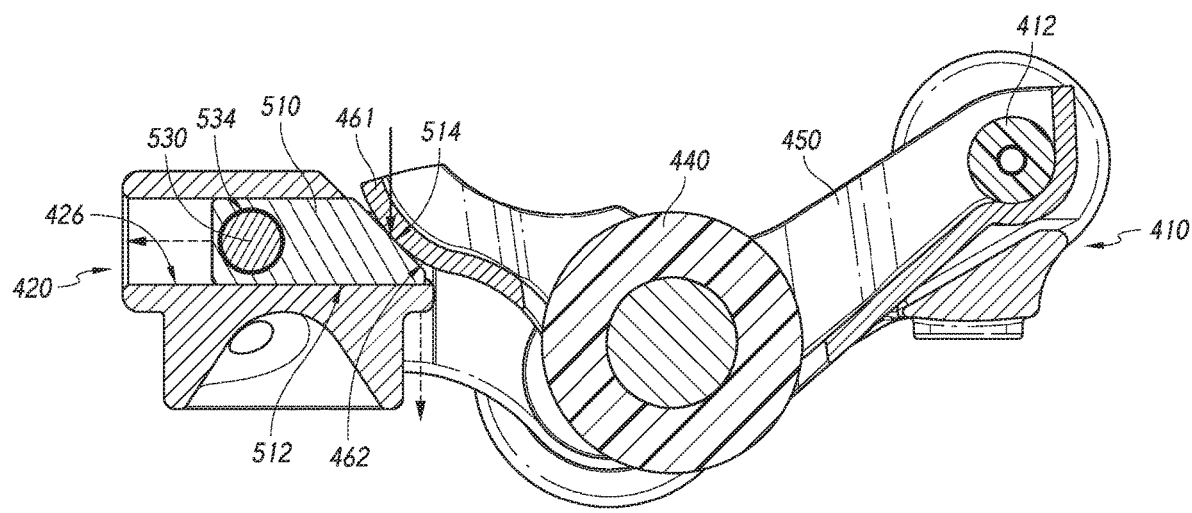
FIG. 9 is cross-section in a lateral plane of the finger follower assembly of FIG. 4 in a second state, which may be "on" or "locked" state.
Figure 10:
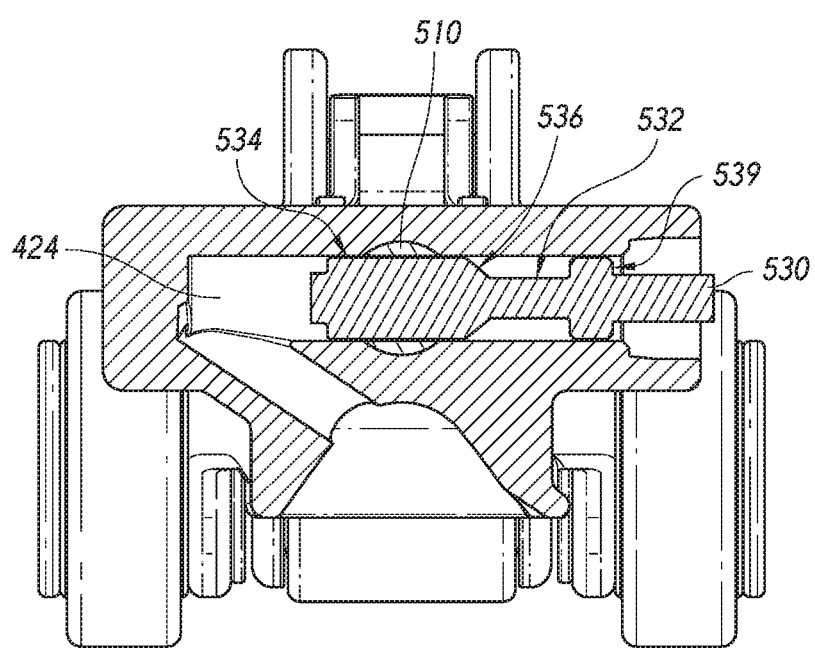
FIG. 10 is a cross section in a transverse plane of the finger follower assembly of FIG. 4 in a second state.

With additional reference to FIGS. 9 and 10, according to aspects of the disclosure, adjustable support assembly 500 may be actuated to cause the lever 450 to be supported at a second position relative to body 400. When pressurized hydraulic fluid is provided, for example, from a passage in the supporting HLA (not shown) via the passage 428 to the transverse bore 424, the leftward bias applied to the piston 530 may be overcome such that the piston 530 displaces to a point where the second support surface 534 is aligned with and supports the lever engaging member or latch 510. It will be recognized from the instant disclosure that other actuation techniques may be utilized instead of or in addition to the hydraulic fluid actuation system described by example herein. For example, pneumatic, electromagnetic or purely mechanically interacting components may be utilized to provide the motive force for actuation of elements, such as the actuating piston or pin 530 described. Transition surface 536 may cause the lever engaging member 510 to move (to the right in FIG. 9), from a first latch position to a second latch position, as the piston 530 moves. Consequently, as best shown in FIG. 9, the lever end surface 462 may contact the sliding member surface 514, in this case, at a comparatively high point of the sliding member contact surface 506. Lever 450 and central roller follower 440 are thus supported in a second position, in this case, higher than the position corresponding to the first (retracted) position of the lever engaging member 510 and central roller follower 440 may take up any lash between the central roller follower 440 and its corresponding valve actuation motion source. In this manner, valve actuation motions are applied to the central roller follower 440 and thereafter conveyed to the body 400 by virtue of the contact between the lever 450 and lever engaging member 510, and the further contact between the lever engaging member 510 and the body 400. As will be recognized from the instant disclosure, and as will be described in more detail in the context of a lost-motion, cylinder deactivation application below, the first and second positions of the latch may define alternative states of the lever. More particularly, in a lost-motion cylinder deactivation context, the first position of the latch may be a "normal" operating state facilitating a higher elevation of the lever relative to the follower body and the second position of the latch may be a (retracted) "lost-motion activated" operating state, wherein the lever does not engage the latch at all but instead may lower to a resting position relative to the follower body (i.e., facilitated by a stop defining a lower limit of travel of the lever). In this state, the lever is in a lower position such that all valve motion that would otherwise be conveyed by the motion source may be "lost" or absorbed by the finger follower system.

According to an aspect of the disclosure, the adjustable support assembly 500 provides advantages in distributing the load applied by the lever 450 (illustrated by the heavy black arrow in FIG. 9). More particularly, a vertical component of the load is distributed to the body 400 (illustrated by the vertical dashed arrow) via the engagement of outer surface 512 of lever engaging member, also referred to herein as a latch 510, with guiding surface 423 of longitudinal bore 422. A horizontal component (illustrated by the horizontal dashed arrow) of the load is distributed through the lever engaging member or latch 510 to the piston 530. As will be recognized, the angle of lever engaging member surface 514 may be selected to provide for a majority of the load to be distributed across a larger area of the guiding surface 423 of longitudinal bore 422, with a smaller component of the load being borne by the actuating piston 530. It will be further recognized that this load distribution will result regardless of the position of the lever engaging member or latch 510 within the longitudinal bore 422. Moreover, owing to the unique interaction of the lever end surface 462 with the surface 514 of the lever engaging member or latch 510, the potential for partial engagement between these elements is effectively eliminated. Additionally, by providing the lever end surface 462 with a substantially arcuate shape as shown, the contact stress between the lever engaging member 510 and lever end surface 462 may be controlled, that is, the size and geometry of the contact area between elements can be kept substantially consistent, in all operating states and positions of the lever relative to the body, i.e., regardless of the position at which the lever engaging member 510 engages the lever end surface 462.

The lever engaging surface 514 and lever end surface 462 may be adapted to maintain a substantially similar contact geometry in all positions of the lever in which it contacts the lever engaging surface 514. This leads to improved durability and performance.

Still further, the unique interaction between the support surfaces of piston 530 and the lever engaging member or latch 510 provide for two positively defined switched support positions for the lever 450, which positions, and thus the corresponding motions of the actuated valves, may be very precisely controlled. Moreover, because the forces involved in the interaction of the piston 530 with the lever engaging member 510 are reduced, durability and consistency in performance are enhanced. A further related advantage of the example adjustable support assemblies according to aspects of the disclosure eliminate the potential for excessive contact stresses during intermediate engagement positions between the lever engaging member 510 and lever 450. Such intermediate positions would be positions that are not either the first or second engagement positions as described above. As will be recognized, when the piston 530 is in the retracted position, there is only one position in which the lever engaging member 510 can possibly be supported. If the lever engaging member is not in the first retracted position, no reactive force from the piston surface 532 is provided. Thus, in the event the lever engaging member 510 might remain in the second position or fail retract fully into the longitudinal bore 422 after piston 530 retracts, no reactive force will be provided when the load of the motion source is transmitted to the lever 450 until the lever engaging member 510 is in the first position. In this manner, the system avoids the application of load forces when the actuating components are not in either the first or second positions. Stated another way, the lever support assembly 500 is adapted to provide supporting force to the lever only in a first position or a second position. That is, if the piston 530 is in the first position and the lever engaging member 510 is in a position where it is not engaging the piston, the system permits the lever engaging member 510 to "float" within the longitudinal bore 422 and no reactive force is provided by the piston 530 on the lever engaging member 510 until it properly seats against the piston 530. The adjustable support assembly is thus adapted to allow the lever to move to the first position when the lever is not in the first position or the second position. This arrangement eliminates damage to the supporting components and provides for dependable and durable operation of the switching finger follower.

Figure 11:
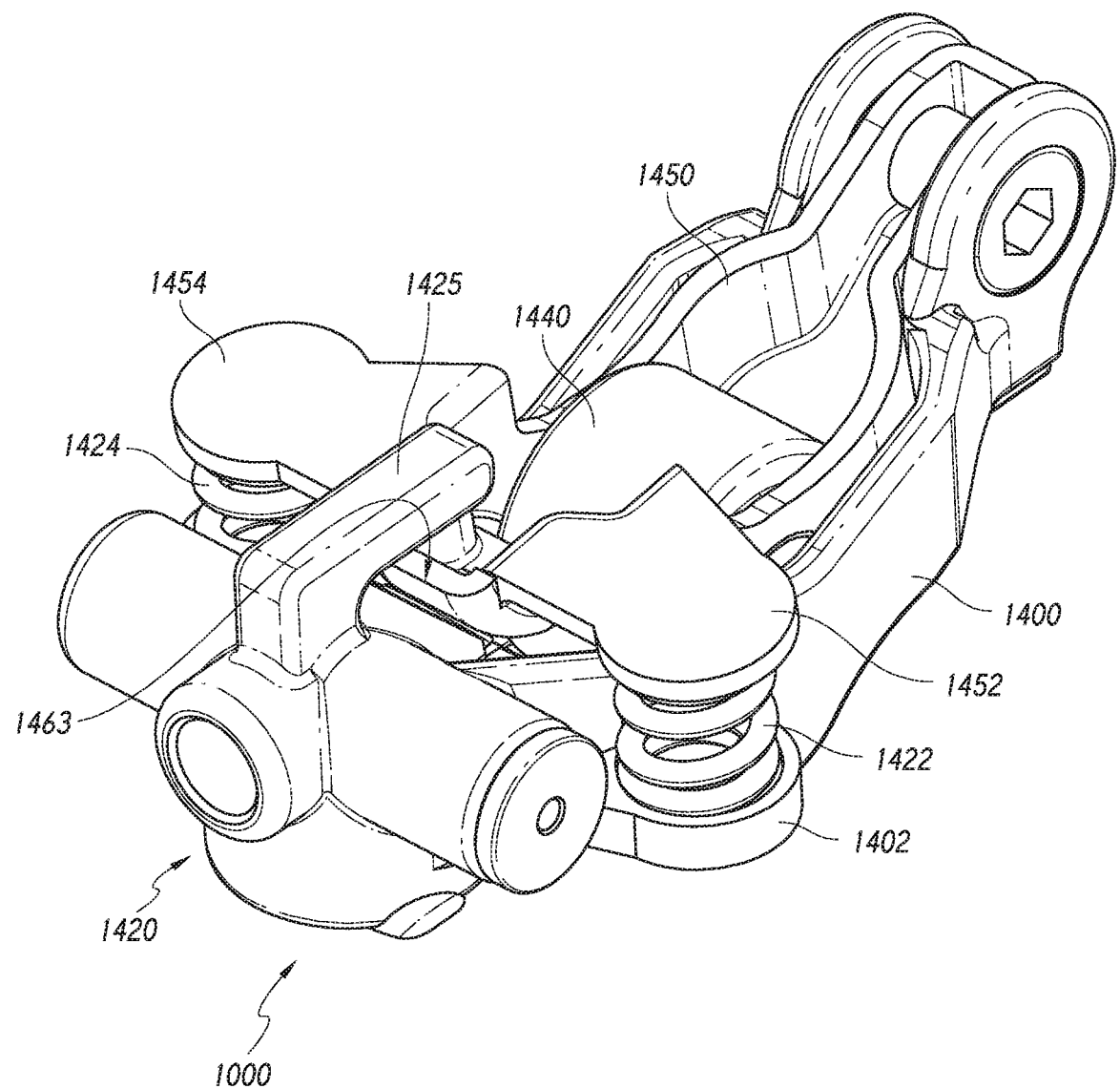
FIG. 11 is a perspective, assembled view of a finger follower assembly according to a second embodiment, with application as a lost motion device.
Figure 12:
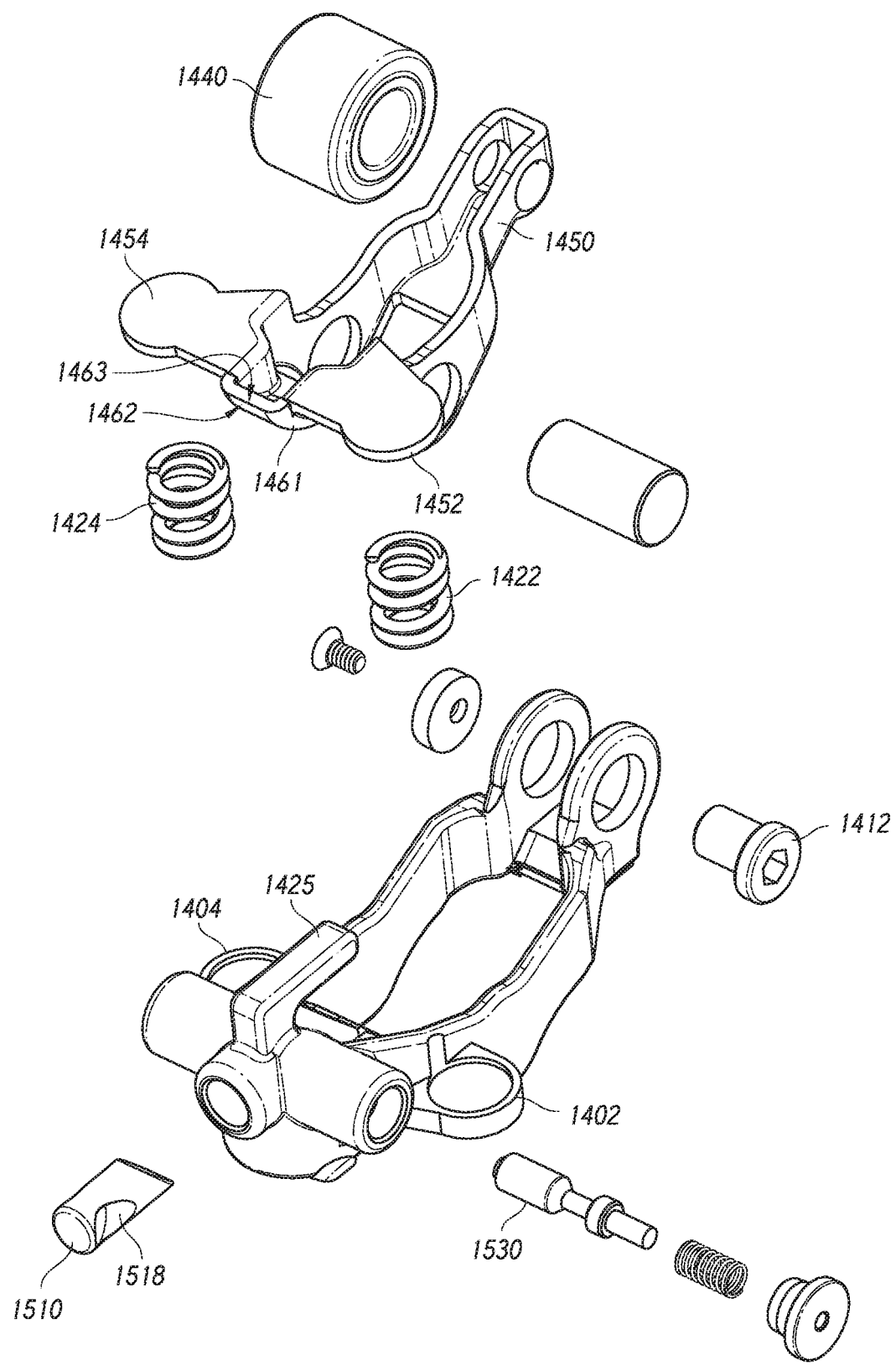
FIG. 12 is an exploded perspective view of the lost motion finger follower assembly of FIG. 11.
Figure 13:
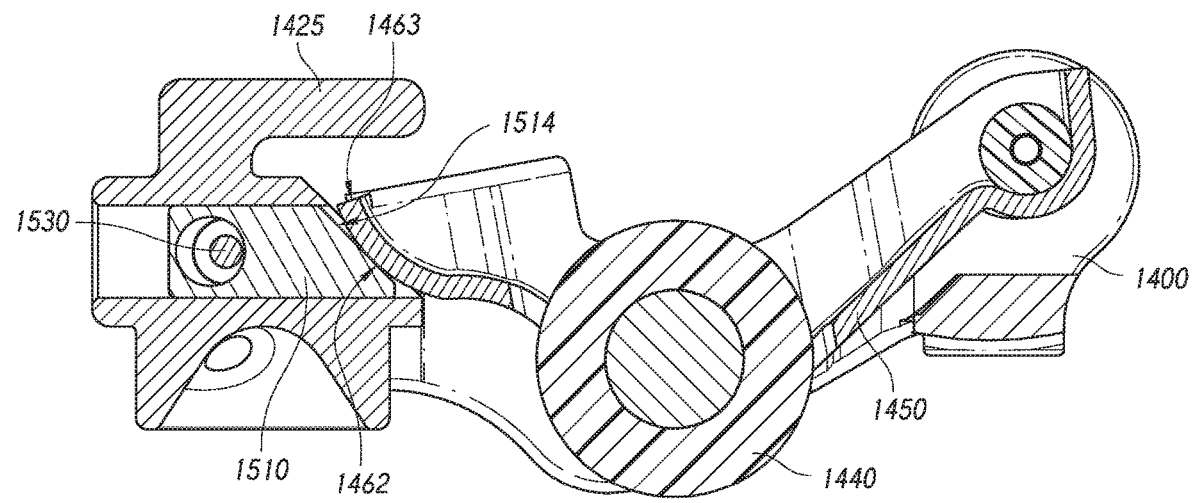
FIG. 13 is a cross-section in a lateral plane of the finger follower assembly of FIG. 11 in a first state, which may be a state where some or all of the valve train motion is lost.

FIGS. 11-13 illustrates a second implementation, which embodies additional aspects according to the instant disclosure. This implementation may be useful as a lost-motion device in engine environments that employ a single motion source, such as a cam, for providing one or more lower lift events, such as auxiliary events, where some lift may be lost, and one or more higher lift events, such as combustion main events, where more (or all) lift from the cam lobe is conveyed to the engine valves. An example lost-motion engine environment is described in U.S. Pat. No. 9,347,383, for example, and the subject matter thereof is incorporated herein by reference in its entirety. As will be recognized, in such applications, a single cam profile having multiple lobes thereon would be used in place of the combination of the central 8 and lateral cam lobes 9 in the environment described above with regard to FIGS. 1-3.

FIG. 11 is a perspective view of an example assembled lost-motion finger follower system 1000 according to an aspect of the disclosure. FIG. 12 is an exploded, perspective view of the same example system. The switching finger follower may have a general construction similar to the embodiment described above with respect to FIGS. 4-10. The structure and operation of the adjustable support assembly 1500, including piston 1530, lever engaging member 1510 and the interaction thereof with end surface 1462 are similar to the implementation described above, which will be understood to apply to this embodiment and need not be repeated. However, as will be recognized, the structure of the body 1400 and lever 1450 may be modified, as described below, to facilitate functioning of the system in lost-motion applications.

One modification may include the addition of a biasing assembly cooperating with the body 1400 and lever 1450 and adapted to bias the lever 1450 towards a raised or deployed position away from the body 1400. The body 1400 may include a pair of laterally extending spring retaining flanges 1402 and 1404. Respective resilient elements (e.g., coil springs) 1422 and 1424 are retained between the flanges and thus bias the lever 1450 and central roller follower 1440 in a direction towards the motion source (i.e., upward in FIGS. 11 and 12).

Another modification is that a travel limiter 1425 may be disposed on a pivot end 1430 of the body 1400 and be formed integrally therewith to limit rotation of the lever 1450 away from the body 1400 by engaging an upper surface 1463 of the lever end wall 1461. While the travel stop 1425 is illustrated as an integral component of the body 1400, it will be appreciated that the travel stop 1425 could be implemented as a separate component attached to the body 1400 or coupled thereto via another component. Moreover, travel stop 1425 may be provided with adjustable features, such as an adjustment screw threaded through the illustrated limiter and secured with a retaining nut to allow adjustment of the upper limit of travel of the lever 1450.

As known in the art, when a hydraulic lash adjuster (HLA) is incorporated into a single-source lost motion valve train, it is necessary to prevent expansion of the HLA during those operating states in which valve actuation motion is being lost, i.e., to prevent the HLA from taking up lash space purposely provided to selective lose valve actuation motions. In the illustrated embodiments, this is achieved by operation of the resilient elements 1422 and 1424 that are chosen such that the force exerted by these elements on the lever 1450 will be greater than force exhibited by an associated HLA when it attempts to expand to take up any available lash. In this manner, the resilient elements 1422, 1424 cause a sufficient load to be applied to the HLA to prevent undesired expansion thereof. On the other hand, uncontrolled application of the force provided by the resilient elements 1422 and 1424 to the HLA could cause undue compression or bleed-down of the HLA. Thus, the travel limiter stop 1425 may limit travel of the lever 1450 and, consequently, the force applied by the resilient elements 1422, 1424 to any accompanying HLA. The distance of travel of the lever 1450 permitted by the travel stop 1425 is preferably controlled so that when the HLA is operating to take up lash space in the valvetrain when the lever 1450 is against the travel stop 1425, the travel of the lost motion is equal to the valve lift events that are lost. For example, if the travel stop 1425 allows excessive stroke of the lever 1450, the lost motion operating state will lose excessive motion and the comparatively high-lift valve events (e.g., main events) will have excessive lash, resulting in undesirable lower valve lift and higher valve seating velocities. Conversely, if the travel stop 1425 allows inadequate stroke of the lever 1450, an insufficient amount of lash space will be established during lost motion operation and some of the valve actuation motion intended to be lost will nevertheless be conveyed by the finger follower to the engine valve. This can lead to undesirable consequences such as changed valve lifts and durations, or possibly add unwanted lift events when they are not desired. In embodiments in which the travel stop 1425 is attached to the body 1400 (rather than formed integrally therewith), the travel stop 1425 may be adjustable such the stroke of the lever 1450 can be precisely controlled.

Yet another modification, compared to the embodiment described above relative to FIGS. 4-10, may include the elimination of the lateral roller followers, as such elements may not be necessary in a single motion source environment where the finger follower system 1000 functions as a lost motion device.

In lost motion applications, the adjustable support assembly 1500, in similar fashion to the operations described above with regard to FIGS. 4-10, may provide at least two very precisely controlled positions of the lever 1450 relative to the finger follower body 1400. These two controlled positions may provide for two levels of conveyed motion from the motion source to the actuated valves. The first position may correspond to a partial motion conveyance, and the second position may correspond to full motion conveyance, for example. As will be recognized from the instant disclosure, the described embodiments may be adapted for lost-motion applications where all valve motion that would otherwise be conveyed from the motion source (cam) can be "lost" or absorbed by the finger follower system. In such a case, the lever may have only one precisely defined engagement position with the latch 510 and the lever may assume a second position in which the latch has no engagement with the lever, or where the latch engages the lever and supports it at a low enough position that no valve lift is conveyed from the motion source. The non-engagement configuration of the lever may eliminate the need for precision in manufacturing at least to define the second, disengaged position of the lever.

Referring to FIG. 13, in a state where the lever engaging member 1510 is in a retracted position and supported on the smaller diameter of piston 1530, the lever surface 1462 contacts the lever engaging member surface 1514 at a comparatively low point thereof. Lever 1450 and roller follower 1440 are maintained in a lower position relative to the body 1400, thereby establishing lash between the roller follower 1440 and its corresponding valve actuation motion source. This lash space causes any comparatively low-lift valve actuation motions that would otherwise be applied to the central roller follower 1440 to be lost, whereas any comparatively high-lift valve actuation motions are still received by the roller follower 1440 and conveyed to the finger follower body 1400 and ultimate to the engaged valves.

Figure 14:
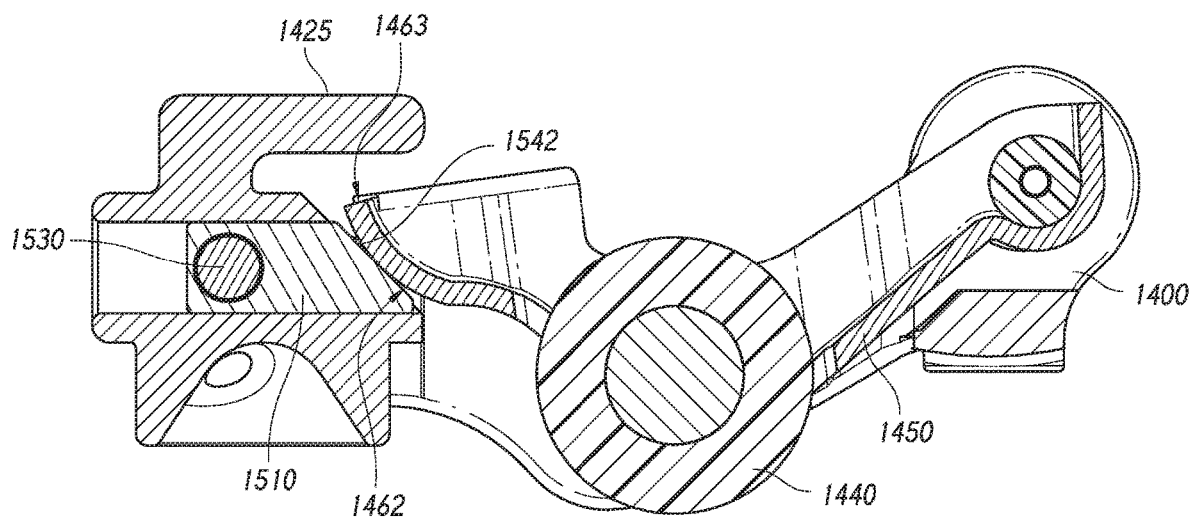
FIG. 14 is a cross-section in a lateral plane of the finger follower assembly of FIG. 11 in a second state, which may be a state where some or all of the valve train motion is conveyed.

Referring additionally to FIG. 14, in a state where the piston 1530 may be hydraulically actuated to overcome the spring biasing force, piston may move to a point where the full diameter portion thereof fully occupies the transverse bore in the lever engaging member 1510. Lever engaging member 1510 is thus in a fully deployed position and the lever 1450 and follower 1440 are maintained in a comparatively high position to take up any lash between the follower 1440 and the valve actuation motion source. In this state, any comparatively low-lift valve actuation motions, as well as comparatively high lift valve actuation motions are applied to the roller follower 1440 and conveyed to the finger follower body 1400 and ultimately to the valve engaged thereby.

In addition to the precisely controlled positions of the lever 1450 relative to the finger follower body 1400 described above, and the resultant precise control of lost motion capabilities provided by the finger follower system, the configuration describe above also provides the advantage of eliminating intermediate positioning of the lever 1450 and thus intermediate conveyance of valve motion. As described above in detail with regard to the operation of the adjustable support assembly 500 in the embodiment of FIGS. 4-10, the adjustable support assembly 1500 may be adapted to provide support in two defined positions, owing to the interaction of piston 1530 and lever engaging member 1510.

Figure 15:
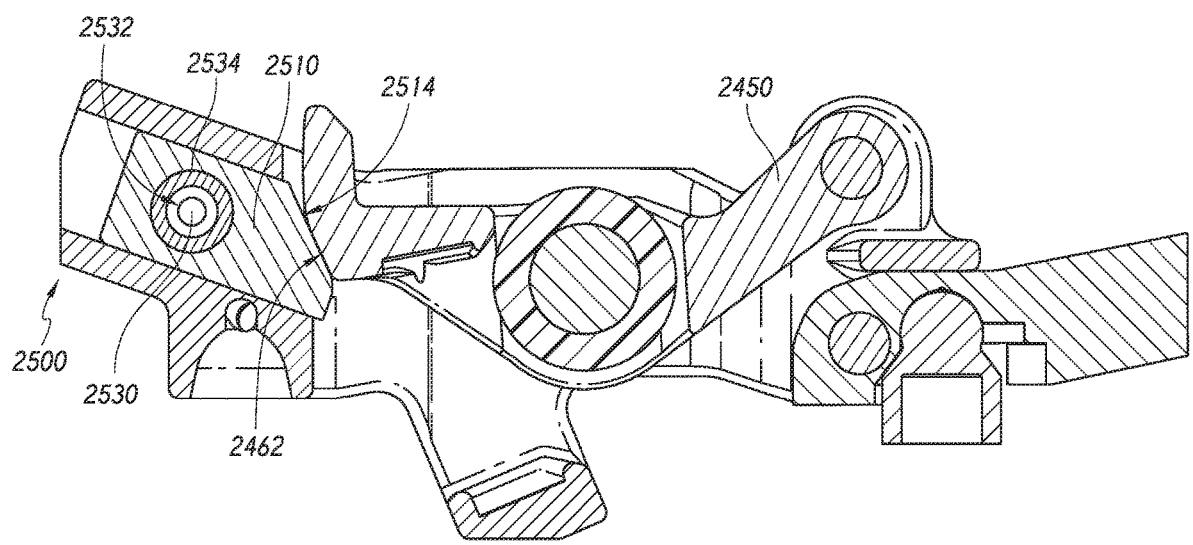
FIG. 15 is a cross-section in a lateral plane of another embodiment of a finger follower assembly which permits the lever to pivot free of a support assembly to facilitate full motion loss.

FIG. 15 illustrates another embodiment according to aspects of the disclosure, which may be useful in applications, such as cylinder deactivation applications, where complete loss of valve motion may be facilitated. In this embodiment, lower lever positioning is facilitated by an adjustable support assembly 2500 that permits the lever to pivot free of the latch 2510 and thus to a (second) lever position that is a lower position relative to the follower body than provided with the previously described embodiments. FIG. 15 illustrates the latch 2510 in a first position in which the larger diameter surface 2534 engages the transverse bore of latch 2510, supporting it in the extended position shown, where latch surface 2514 engages lever surface 2462, thereby retaining lever 2450 in the (first) position shown. This position may correspond to a "de-energized" state of the actuator piston 2530 (i.e., a "normally latched" lever position) where the lever 2450 is positioned to convey normal valve motion. According to aspects of this embodiment, when the piston 2530 is energized, the smaller diameter surface 2532 aligns with the latch transverse bore, permitting the latch 2510 to retract (i.e., move up and to the left in FIG. 15). This position of latch 2510 permits the lever 2450 to pivot to a lower position in which it is entirely free and not engaging the latch 2510. This configuration may thus be useful in applications, such as cylinder deactivation applications, where such a low lever position is required for full loss of valve motion.

Figure 16:
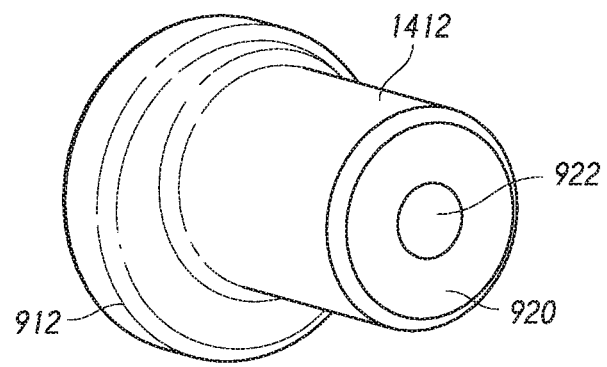
FIG. 16 is a perspective view showing an eccentric pivot mount.
Figure 17:
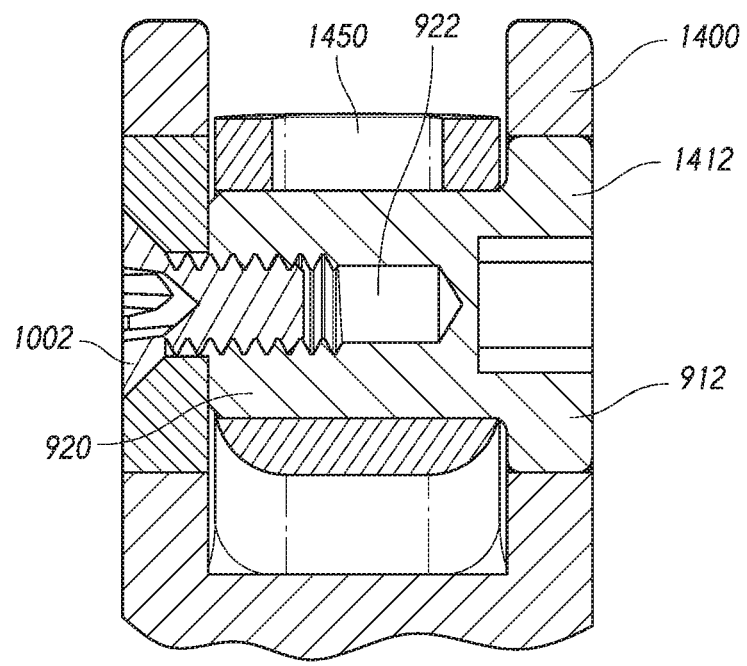
FIG. 17 is a cross section of the pivot mount of FIG. 16.

FIGS. 16 and 17 illustrate details of a pivot pin 1412 that may be used in either of the aforementioned implementations. As shown, the pivot member 1412 comprises an eccentric shaft 920 formed therein. In particular, an axis of the shaft 920 is not aligned with an axis of the pivot member 912. Additionally, a threaded mounting hole 922 is provided in the eccentric shaft 920. As best shown in FIG. 17, the pivot member 912 may be supported by the body 1400 with the lever 1450 mounted for rotation on the eccentric shaft 920. A suitable fastener 1002 may be used to secure the assembly of the pivot member 912, lever 408 and body 400. By selectively rotating the pivot member 912, the position of the eccentric shaft 922 may be moved relative to the body 1400 such that the pivoting end of the lever 408 is likewise shifted upward or downward relative to the body 1400. In this manner, the pivot member 912 can be used to adjust or control the position of the lever 1450 to work with different cam profiles, establish varying lash settings or allow for less precise and costly manufacturing processes.

As will be recognized, various geometrical variations in the shapes of interacting surfaces of the lever engaging member or latch 510, actuating piston 530, lever end surface 462 and other surfaces described herein may be provided without departing from the spirit and scope of the invention. For example, lever engaging member or latch 510 may be provided with a curved or arcuate surface and lever 450 provided with a flat surface. Moreover, while described as cylindrical shaped elements, piston and lever engaging member may be provided with square or rectangular or other cross-sectional shapes.

For further example, while the lever engaging member 530 has been illustrated ad described as operating under the control of mechanical interaction with the piston 530, which is in turn hydraulically controlled, it is appreciated that other configurations for controlling the lever engaging member may be employed. For example, the lever engaging member 530 may be biased into its unlocked or off state by a resilient element, and a hydraulic passage may be connected to the bore in which the lever engaging member 530 resides such that application of hydraulic fluid to the passage causes extension of the lever engaging member 530 into its locked or on state while a locked volume of hydraulic fluid within the sliding member's bore maintains the lever engaging member 530 in its extended position. As another example, while the lever contact surface 462 has been illustrated as having an arcuate shape, this is not a requirement and other surface configurations, e.g., angled, semicircular, etc., may be equally employed. Further still, it will be appreciated that the configuration of the body 400 and lever 450 could be reversed, i.e., that a central body is provided with an outer, movable arm, which movable arm can be placed in an unlocked/off or locked/on state using one or more similarly configured sliding members as described above.

Although the present implementations have been described with reference to specific example embodiments, it will be evident that various modifications and changes may be made to these embodiments without departing from the broader spirit and scope of the invention as set forth in the claims Accordingly, the specification and drawings are to be regarded in an illustrative rather than a restrictive sense.

The invention claimed is:

1. A finger follower system for use in an internal combustion engine valvetrain, the finger follower system comprising:
 a follower body having a pivot end and a motion transmitting end;
 a lever adapted to pivot relative to the follower body;
 a motion receiving component having a motion receiving surface disposed between the pivot end and the motion transmitting end; and
 an adjustable support assembly including a movable latch configured to provide selective support to the lever, the adjustable support assembly adapted to alternately maintain the latch in a first latch position and a second latch position relative to the follower body wherein the adjustable support assembly further includes an actuating piston extending within a piston receiving bore in the latch and cooperating with the latch so as to define the first latch position and the second latch position.

2. The finger follower system of claim 1, wherein the actuating piston includes a transition surface which enables the lever to move the latch to the first latch position when the transition surface is engaged by the latch.

3. The finger follower system of claim 1, wherein the adjustable support assembly is further adapted to provide engagement between the lever and the latch when the latch is in the first latch position.

4. The finger follower system of claim 1, wherein the adjustable support assembly is further adapted to permit the lever to pivot to a lever position in which the lever is not engaged with the latch.

5. The finger follower system of claim 1, wherein the adjustable support assembly is further adapted to provide engagement between the lever and the latch when the latch is in the second position.

6. The finger follower system of claim 1, wherein the actuating piston is adapted to provide a reactive supporting force on the latch when the latch is in the first latch position and when the latch is in the second latch position, and wherein the actuating piston includes a transition surface that is adapted to permit the latch and actuating piston to move when the latch is between the first latch position and the second latch position.

7. The finger follower system of claim 1, wherein the follower body further includes a guide bore, and wherein the latch is arranged to move within the guide bore.

8. The finger follower system of claim 1, wherein the follower body further includes a working fluid passage in fluid communication with the actuating piston.

9. The finger follower system of claim 1, wherein the actuating piston includes a first actuating piston surface adapted to support the latch in the first latch position, and a second actuating piston surface adapted to support the latch in the second latch position.

10. The finger follower system of claim 9, wherein the first actuating piston surface extends at a first distance from an axis of the actuating piston, and wherein the second actuating piston surface extends at a second distance from the axis of the actuating piston.

11. The finger follower system of claim 9, wherein the second actuating piston surface corresponds to the piston receiving bore.

12. The finger follower system of claim 9, wherein the actuating piston further includes a transition surface between the first actuating piston surface and the second actuating piston surface, the transition surface adapted to move the latch from the first latch position to the second latch position when the actuating piston is actuated.

13. The finger follower system of claim 1, wherein the lever includes a lever surface adapted to engage a latch surface of the latch, wherein at least one of the latch surface and the lever surface includes an arcuate surface.

14. The finger follower system of claim 1, wherein the lever includes a lever surface adapted to engage a latch surface of the latch, wherein the latch surface and the lever surface are adapted to maintain a substantially similar contact geometry when the latch surface and the lever surface are engaged in all positions of the lever.

15. The finger follower system of claim 1, wherein the latch is adapted to move relative to the follower body in a latch motion direction and wherein the latch includes a substantially planar latch surface extending at a latch surface angle relative to the latch motion direction.

16. The finger follower system of claim 15, wherein the latch is adapted to move relative to a guide surface on the follower body and wherein the latch surface angle is such that a majority of a loading force exerted by the lever on the latch is applied to the guide surface.

17. The finger follower system of claim 1, wherein the motion receiving component is a cam follower roller cooperating with the lever.

18. The finger follower system of claim 1, wherein the motion receiving surface is formed integrally on the lever.

19. The finger follower system of claim 1, wherein the lever is coupled to the follower body via an eccentric mounting element, which permits a position of a pivoting end of the lever to be adjusted relative to the follower body.

20. The finger follower system of claim 1, further comprising a lever biasing assembly for biasing the lever towards a motion source.

21. The finger follower system of claim 20, further comprising a travel limiter for limiting travel of the lever relative to the follower body.

22. The finger follower system of claim 20, further comprising a hydraulic lash adjuster in the valvetrain, the hydraulic lash adjuster having a lash adjustment force, wherein the lever biasing assembly provides a biasing force on the lever that is greater than the lash adjustment force.

23. The finger follower system of claim 20, wherein the lever biasing assembly comprises at least one resilient element disposed between the lever and the follower body.

24. The finger follower system of claim 20, further comprising at least one follower body spring support disposed on the follower body and at least one lever spring support disposed on the lever, the lever biasing assembly including at least one respective resilient element disposed between the follower body spring support and the lever spring support.

25. The finger follower system of claim 21, wherein a position of the travel limiter relative to the follower body is adapted to provide for adjustment of an upper limit of the travel of the lever relative to the follower body.

* * * * *